Sept. 23, 1969 M. E. PARTIN 3,469,238
CHARACTER RECOGNITION APPARATUS USING SINGLE STROKE
SCANSION OF CHARACTER AREA WITH ELONGATE IMAGE
Filed March 30, 1965 2 Sheets-Sheet 1

INVENTOR
MELVIN E. PARTIN
BY
Fordyce A. Bothwell
ATTORNEY

Sept. 23, 1969 M. E. PARTIN 3,469,238
CHARACTER RECOGNITION APPARATUS USING SINGLE STROKE
SCANSION OF CHARACTER AREA WITH ELONGATE IMAGE
Filed March 30, 1965 2 Sheets-Sheet 2

INVENTOR.
MELVIN E. PARTIN
BY
Fordyce A. Bothwell
ATTORNEY

United States Patent Office 3,469,238
Patented Sept. 23, 1969

3,469,238

CHARACTER RECOGNITION APPARATUS USING SINGLE STROKE SCANSION OF CHARACTER AREA WITH ELONGATE IMAGE

Melvin E. Partin, Montgomeryville, Pa., assignor to Philco-Ford Corporation, Philadelphia, Pa., a corporation of Delaware Filed Mar. 30, 1965, Ser. No. 443,814
Int. Cl. G06k 9/02
U.S. Cl. 340—146.3 3 Claims

ABSTRACT OF THE DISCLOSURE

Character recognition apparatus using single stroke scansion of character area with elongate image. A plurality of photoresponsive devices view scanned area through masks of differing transparencies to develop signals which are differentiated, forming pulses which are counted to obtain indication of character identity.

This invention relates generally to apparatus adapted to read or recognize characters such as typed or printed letters and particularly to such apparatus which optically scans a character to be recognized.

A simple form of scanning arrangement for such apparatus is one in which a light image, which may be of elongate form, is caused to scan the entire character to be recognized in a single scanning stroke. While such a scanning arrangement is highly desirable, especially because of its simplicity, it suffers from inaccuracy because insufficient information is produced.

One object of the present invention is to overcome the above-mentioned disadvantage of apparatus which scans with an elongate light image.

Another object of the invention is to provide apparatus which scans a character with a single simple stroke.

This invention is based on the concept that accurate character recognition can be achieved by producing plural electrical waveforms representative of the light reflectivity of scanned area when viewed panoramically through plural masks having different transparency patterns. Such waveforms can be produced by deriving plural images of the scanned area as seen through such masks and then translating said images into the desired waveforms.

In one form of apparatus according to this invention, the identification of the character from said waveforms is effected by differentiating the waveforms and by deriving from the positive and negative excursions of the derivative waveforms a pulse code which represents the character.

By way of example, the apparatus hereinafter described utilizes three masks, the first having a uniform transparency, the second having a light transmissivity which decreases in a direction transverse to the direction of scanning, and the third having a light transmissivity which varies in a direction opposite to that of the second mask. Thus where a vertically oriented character to be recognized is scanned horizontally by a vertical slit image, one of the latter two masks has a downwardly decreasing transmissivity while the other is of upwardly decreasing transmissivity. The three images of the character as seen through the masks are translated into the electrical waveforms which are utilized to estabilsh the identity of the character. Preferably this is done by differentiation of said waveforms to produce bipolar waveforms, followed by derivation of unipolar pulses which are supplied to counters.

DRAWINGS

FIG. 1

Figure 1:
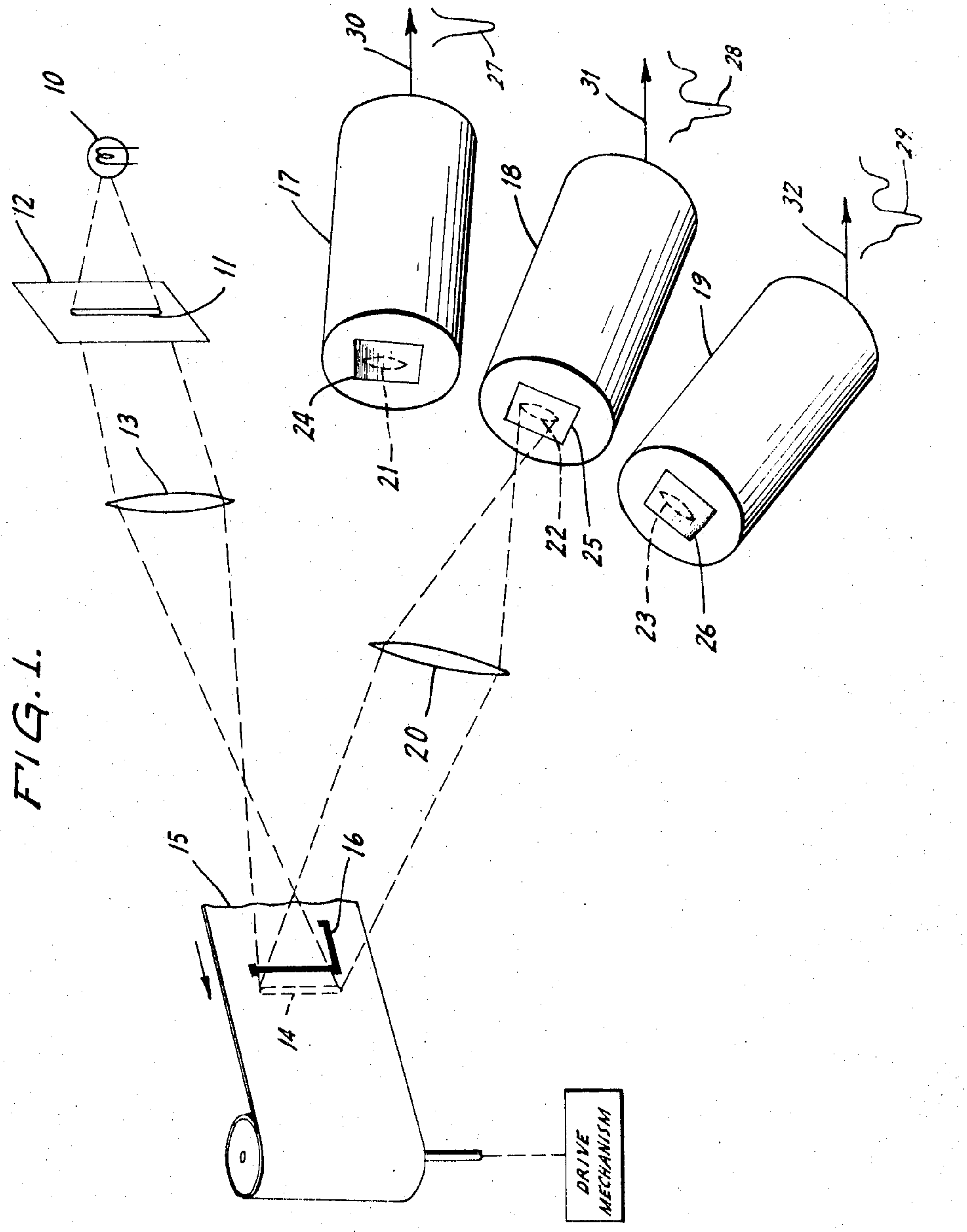
FIG. 1 is a schematic perspective view of a scanning arrangement according to the present invention.

FIG. 1 shows a light source 10 which projects light through a slit 11 in a mask 12 to form an elongate beam which is projected through a lens 13 to form an elongate light image 14 on a plane or surface 15 on which there is a character 16 to be recognized. By way of example, the character shown is the capital letter L. Relative movement is effective between the light image 14 and the character 16 to cause scanning of the character area by the light image. For example, the light images 14 may remain stationary while the character is carried on a moving web as illustrated. Alternatively, the character may remain stationary and the slit 11 or the light source 10 may be moved. The light image 14 is reflected from the character area and projected by lenses onto the photocathode surfaces of photomultipliers 17, 18 and 19. For clarity of illustration, only one lens 20 is shown which projects a reflected image in inverted form onto the photo-cathode surface of photomultiplier 18. Other lenses (not shown) project reflected images in the same manner onto the photo-cathode surfaces of photomultipliers 17 and 19.

The images 21, 22 and 23 are projected through masks 24, 25, and 26 which have different transparency patterns. The light transmissivity of the center mask 25 is uniform throughout its area. The transparency of mask 24 is a maximum at the bottom and decreases upwardly to a minimum at the top. The transparency of mask 26 is a maximum at the top and decreases downwardly to a minimum at the bottom. Thus as the character 16 is scanned, the image at any instant on the photo-cathode surface of each photomultiplier is determined by the character being scanned and by the transparency pattern of the associated mask.

For simplicity it may be assumed that the transparency of masks 24 and 26 varies linearly; however it could vary in some other way, such as exponentially. The masks may be photographic film which have been exposed and developed to provide the desired transparency patterns.

The waveforms produced at the output terminals 30, 31, and 32 of the respective photomultipliers 17, 18 and 19 are shown at 27, 28 and 29. These waveforms are utilized to determine the character which they represent. While the invention contemplates the use of any suitable means for so utilizing the waveforms, a preferred system is shown in FIG. 2.

Figure 2:
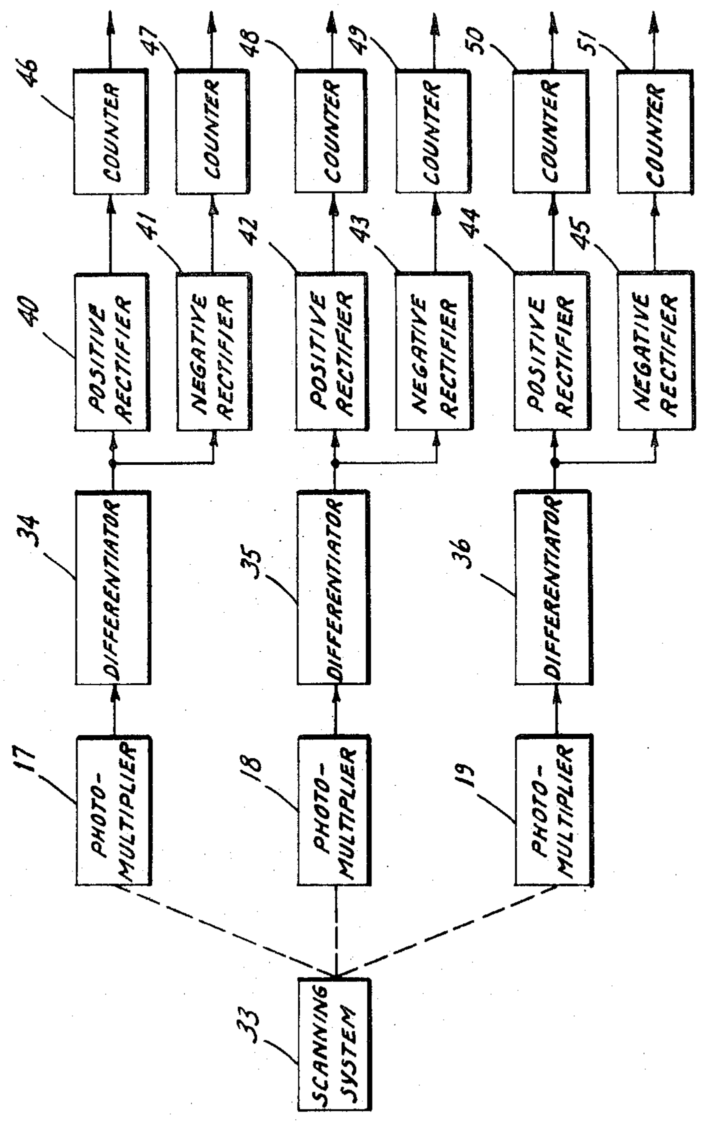
FIG. 2 is a block diagram of a character recognition system according to the invention.
Figure 3:
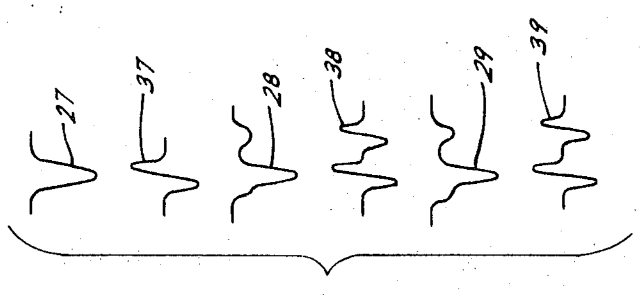
FIG. 3 is an illustration of the waveforms produced in the system of FIG. 2.

FIGS. 2 and 3

In FIG. 2, block 33 represents the scanning system of FIG. 1. The waveforms produced by the photomultipliers are again shown in FIG. 3 at 27, 28, and 29. These waveforms are differentiated in differentiators 34, 35 and 36 to produce derivative waveforms as shown in FIG. 3 at 37, 38 and 39. Recognition of the scanned character is determined by the number of positive and negative excursions of the derivative waveforms. In waveform 37 there is one negative excursion and one positive excursion, while in each of waveforms 38 and 39 there are two negative excursions and two positive excursions. Negative and positive pulses are derived from the respective negative and positive excursions by means of negative and positive rectifiers 40 to 45; these pulses are supplied to counters 46 to 51. As a result of scansion of the letter L, the following pulses are supplied to the respective counters 46 to 51: 1 positive, 1 negative, 2 positive, 2 negative, 2 positive, and 2 negative. These pulses form the code "1-1-2-2-2-2" which can be utilized by recognition apparatus to indicate recognition of the letter L. For example, at the end of scan, the counters may be sampled to supply their encoded count to appropriate recognition circuitry which will provide an indication of an "L" in response to the above-quoted code.

From the foregoing description it will be seen that the essence of the present invention is the production of plural waveforms which are representative of a character as viewed panoramically through plural masks having different transparency patterns, and the utilization of said waveforms to determine the character.

The invention has been described, by way of example, with reference to recognition or reading of the capital letter L. It is similarly applicable to recognition of the other letters of the alphabet.

While a particular embodiment of the invention has been illustrated and described, it will be understood that the invention is not limited thereto but contemplates such modifications and further embodiments as may occur to those skilled in the art.

I claim:

1. Character recognition apparatus, comprising: means for producing plural electrical waveforms representative of a character as viewed panoramically through plural masks having different transparency patterns, means for differentiating said waveforms to produce derivative waveforms, means for deriving positive and negative pulses corresponding to the positive and negative excursions of said derivative waveforms, and means for counting the positive and negative pulses derived from each of said derivative waveforms, thereby to determine the identity of said character.

2. Character recognition apparatus, comprising: a light source, a mask having a slit through which light from said source passes to form an elongate light beam, a surface having thereon a character to be recognized, means for projecting said beam onto said surface to form thereon an elongate light image for scanning said character in a single movement, means for effecting relative movement between said image and said surface to effect the scanning of said character, a plurality of photomultipliers, means for projecting reflected light images from said surface onto the photo-cathode surfaces of said photomultipliers, a plurality of masks disposed respectively in the paths of projection to the photomultipliers, said masks having different patterns of transparency, whereby said photomultipliers produce different electrical waveforms, means for differentiating said waveforms to produce derivative waveforms, means for deriving positive and negative pulses corresponding to the positive and negative excursions of said derivative waveforms, and means for counting the positive and negative pulses derived from each of said derivative waveforms, thereby to determine said character.

3. Character recognition apparatus, comprising: a light source, a mask having a slit through which light from said source passes to form an elongate light beam, a surface for carrying a character to be recognized, means for projecting said beam onto said surface to form thereon an elongate light image capable of scanning a character area thereon in single movement, means for effecting relative movement between said image and said surface to effect the scanning of said character within said area, a plurality of photomultipliers, means for projecting reflected light images from said surface onto the photocathode surfaces of said photomultipliers, a plurality of masks disposed respectively in the paths of projection from said surface to said photomultipliers, said masks having different patterns of transparency, and means for utilizing the outputs of said photomultipliers to determine the identity of said character, said means for utilizing said outputs comprising means for differentiating the output of each of said photomultipliers to produce bipolar derivative waveforms, means for deriving positive and negative pulses corresponding to the positive and negative excursions of each of said derivative waveforms, and means for counting said positive and negative pulses derived from each of said derivative waveforms, thereby to determine the identity of said character.

References Cited

UNITED STATES PATENTS

| | | | |
|---|---|---|---|
| 3,113,298 | 12/1963 | Poland | 340—146.3 |
| 3,196,393 | 7/1965 | Siegemund | 178—5.4 |
| 3,292,148 | 12/1966 | Giuliano | 340—146.3 |

FOREIGN PATENTS

| | | |
|---|---|---|
| 845,510 | 8/1960 | Netherlands. |
| 897,316 | 5/1962 | Great Britain. |

MAYNARD R. WILBUR, Primary Examiner

LEO BOUDREAU, Assistant Examiner

U.S. Cl. X.R.

235—92; 250—219